United States Patent
Shenai et al.

[11] Patent Number: 5,959,439
[45] Date of Patent: Sep. 28, 1999

[54] MONOLITHIC DC TO DC CONVERTER

[75] Inventors: Krishna Shenai, Naperville; Malay Trivedi, Chicago, both of Ill.

[73] Assignee: The Board of Trustees of the University of Illinois, Urbana, Ill.

[21] Appl. No.: 09/081,156

[22] Filed: May 18, 1998

Related U.S. Application Data

[60] Provisional application No. 60/047,532, May 23, 1997.

[51] Int. Cl.⁶ ............................................. G05F 1/10
[52] U.S. Cl. .................................. 323/222; 323/282
[58] Field of Search .................................. 323/222, 283, 323/284, 282; 363/147

[56] References Cited

U.S. PATENT DOCUMENTS

| | | | |
|---|---|---|---|
| 4,758,937 | 7/1988 | Usui et al. | 363/19 |
| 4,806,842 | 2/1989 | Bittner | 323/222 |
| 4,922,396 | 5/1990 | Niggemeyer | 363/21 |
| 5,088,017 | 2/1992 | Yaginuma et al. | 363/21 |
| 5,245,524 | 9/1993 | Nakagawa et al. | 363/62 |
| 5,272,614 | 12/1993 | Brunk et al. | 363/21 |
| 5,355,301 | 10/1994 | Saito et al. | 363/147 |
| 5,455,501 | 10/1995 | Massie | 323/267 |
| 5,469,399 | 11/1995 | Sato et al. | 327/530 |
| 5,489,837 | 2/1996 | Arakawa | 323/222 |
| 5,502,629 | 3/1996 | Ito et al. | 363/60 |
| 5,534,771 | 7/1996 | Massie | 323/285 |
| 5,598,092 | 1/1997 | Ohtsuka et al. | 323/222 |
| 5,757,635 | 5/1998 | Seong | 363/89 |

OTHER PUBLICATIONS

Arbetter, Barry, et al., DC–DC Converter Design for Battery–Operated Systems, IEEE 103—108 (Jun., 1995).
Redl, Richard, Reducing Distortion in Boost Rectifiers with Automatic Control, IEEE 74–80 (Feb., 1997).
Redl, Richard, et al., Smart Driver IC Protects High–Speed IGBTs and MOSFETs Against Short Circuits, APET Sep. 1996 Proceedings 94–100 (Sep., 1996).

*Primary Examiner*—Shawn Riley
*Attorney, Agent, or Firm*—Welsh & Katz, Ltd.

[57] ABSTRACT

A DC to DC voltage converter. The converter includes a voltage step-up device and a rectifier connected to an output of the voltage step-up device providing an output of the DC to DC voltage converter. The converter further includes a switch triggering the voltage doubler each time the output of the DC to DC voltage converter falls below a threshold voltage, the voltage step-up device, rectifier and switch all being fabricated as part of a single integrated circuit.

18 Claims, 3 Drawing Sheets

MONOLITHIC DC TO DC CONVERTER

This application claims benefit of provisional application No. 60/047,532 filed May 23, 1997.

FIELD OF THE INVENTION

The field of the invention is related to DC to DC converters and more particularly to voltage step-up DC to DC converters.

BACKGROUND OF THE INVENTION

Direct current (DC) converters are known. Such devices have usefulness wherever power of differing voltages are needed for devices having differing requirements in the same or closely related systems. For example, a processor chip of a personal computer may require power at a very low level (i.e., 5 volts or less) while a hard disk drive may require power at a much higher level (i.e., 12 volts or more). Further, if the display is in the nature of a cathode ray tube (CRT), then power at a much higher level (i.e., in excess of 10 kV) may be required.

In designing power supplies for systems such as personal computers, a designer may be required to consider a number of factors in achieving an efficient design. For example, if the designer were to specify a number of power supplies, each powered from an alternating current (AC) source, then the designer may be required to provide a step-down transformer for each supply and current protection of both sides of the power supply.

To avoid a multiplicity of power supplies, a designer will often select a voltage most heavily used within the system and design a power supply system around the one voltage. Where some devices require a higher voltage at a much lower power level, the designer may provide a step-up DC to DC converter to supply the specific device involved. Likewise, where a lower voltage is needed, the designer may provide a step-down DC to DC converter.

While DC to DC converters may be designed using a number of strategies, DC to DC converters usually require an internal oscillator. In the case of a step-up DC to DC converter, the oscillator is needed to chop an input DC supply signal into AC for application to a step-up transformer. The step-up transformer will, in turn, usually be followed by a rectifier and filter to provide the final desired voltage.

A step-down DC to DC converter will also often use a oscillator, but for a different reason. For example, if a step down converter were to use a step-down resistor or transistor to step the voltage down to an acceptable level, then a considerable amount of power would be dissipated in the resistor or transistor based upon the well known formula P=IV.

To avoid the heat dissipation in such step-down devices, a transistor connected to an oscillator will often be used to chop the input waveform into a series of pulses, where the width of each pulse is determined by the power required, using a technique called pulse width modulation (PWM). A rectifier may be used to rectify the chopped waveform into the final desired voltage.

The oscillator used in prior art step-up and step-down voltage converters is typically of a free-running variety operating at a constant frequency. Often the frequency is chosen in an effort to maximize transformer efficiency and to avoid transformer core saturation. In the use of PWM technology, the frequency is usually chosen to maximize the efficiency of the chopping and filtering devices.

Prior art voltage converters are known to suffer from poor efficiency. A free-running oscillator consumes a relatively constant level of power from no load to full load. Transformers inherently draw a magnetization current even under no-load conditions.

While prior art power supplies made of discrete components have been relatively effective, changing technology has rendered such devices difficult to use and relatively inefficient. For example, multifunction chips (e.g., application specific integrated circuits (ASICs) used in communications devices such as telephones, modems, video games, etc.) may require a number of different data processing technologies and internal voltages for proper operation. A microprocessor may require a 3.3 volt power supply, while a radio frequency (RF) transceiver may require 5 volts. An output power amplifier may require 12 volts, while a flat panel display may require as much as 17 volts.

Further, the more functions that are placed on a multifunction chip, the more chip leads are required for connection to the outside world to access and control those functions. The presence of multiple voltage requirements exacerbates the problem of accessability in that more leads must be dedicated to supplying those voltages to the internal structures requiring those voltages. Accordingly, a need exists for a structure for adjusting voltage levels within the chip that can be fabricated on the chip using known chip fabricating techniques.

SUMMARY

A DC to DC voltage converter is provided. The converter includes a voltage step-up device and a rectifier connected to an output of the voltage step-up device which provides an output of the DC to DC voltage converter. The converter further includes a switch triggering the voltage doubler each time the output of the DC to DC voltage converter falls below a threshold voltage, the voltage step-up device, rectifier and switch all being fabricated as part of a single integrated circuit.

DETAILED DESCRIPTION OF THE INVENTION

Figure 1:
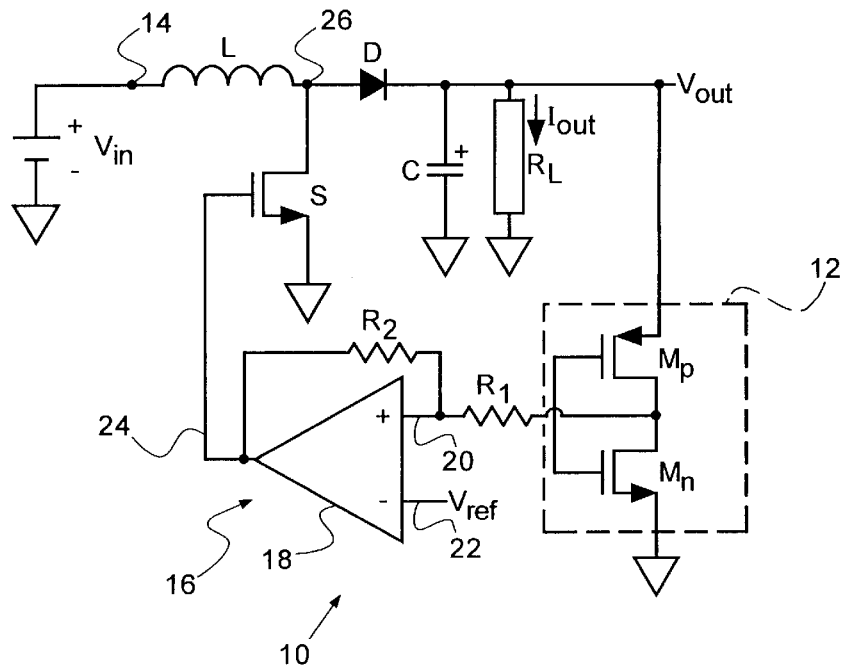
FIG. 1 is a schematic view of a DC to DC voltage converter in accordance with an embodiment of the invention.

FIG. 1 is a schematic diagram of a DC to DC step-up voltage converter 10, generally, in accordance with an embodiment of the invention. It is contemplated that the converter 10 would be fabricated as an integral part of a multifunction chip using existing chip fabricating techniques (e.g., CMOS, BiCMOS, etc.).

Under one embodiment, the step-up converter 10 is fabricated using CMOS technology. A well known fabrication design and a construction technique commonly referred to as MOSIS is used to fabricate the step-up converter 10 with a 1.2 $\mu$m line quality.

The step-up converter 10 may be constructed to accept a supply voltage $V_{INPUT}$ of 5 volts and to step-up the input voltage $V_{INPUT}$ to a final output value $V_{OUT}$ of 10 volts. The step-up converter 10 may be constructed to provide any appropriate current capability (e.g., 200 mA).

The step-up converter 10 is a variable frequency device which accomplishes a voltage step-up through the interaction of the supply voltage $V_{INPUT}$, the inductor L and the switch S. The switch S may be an n-channel MOS device.

Voltage step-up is accomplished by a voltage doubler (voltage step-up device) consisting of the inductor L operating in combination with the supply voltage $V_{INPUT}$. Each time the switch S is activated (i.e., brought to a conductive state), the output 26 of the inductor L is pulled low. As the output 26 is pulled low, the input voltage $V_{INPUT}$ appears across L, with a positive polarity at 14 and a negative polarity at 26. After current has ramped-up through the inductor L for a short time period, the switch S is turned off. When the switch S is turned off, the voltage across L reverses, with a voltage substantially equal to $V_{INPUT}$ appearing across the inductor L, with a positive value at the output side 26. The result is a voltage substantially equal to two times $V_{INPUT}$ appearing at the output 26 of the inductor L.

The voltage appearing at the output 26 of the inductor L causes a current to flow from the inductor L through a diode D and into a filtering capacitor C. From the capacitor C, the stepped-up voltage is applied to a load $R_L$ and appears at an output $V_{OUT}$.

Control of the output voltage $V_{OUT}$ is accomplished via a feedback loop including a voltage divider 12 and Schmidt trigger 16. The voltage divider 12 may be implemented using a series connected p-channel and n-channel MOSFET as shown in FIG. 1 or by virtue of a pair of voltage dividing resistors fabricated on the chip using well-known methods.

As a voltage $V_{OUT}$ of the step-up converter 10 falls, the falling voltage is sensed through the divider 12 at the positive input 20 of an operational amplifier of the Schmidt trigger 16. Where the positive input 20 falls below the reference voltage $V_{ref}$ at the negative input 22, the output 24 of the amplifier 16 goes low, turning off the switch S. Turning off the switch S causes a voltage peak to occur at the output 12 of the inductor L, which causes the capacitor C to begin charging.

As the capacitor C begins charging, the voltage $V_{OUT}$ begins to rise. As the output voltage $V_{OUT}$ begins to rise, the positive input 20 of the Schmidt trigger 16 also begins to rise. However, since the output 24 of the amplifier 18 is now in a low state, the feedback resistor $R_2$ tends to reduce the rate of rise of the voltage at the positive input 20 of the amplifier 18 until the output voltage $V_{OUT}$ of the converter is at a higher voltage than would otherwise be necessary. As a result of the hysteresis provided by the feedback resistor $R_2$, the amplifier 18 does not activate until the output of the voltage divider 12 has risen to a value higher than the previous turn-off point of the amplifier 18.

While the DC to DC converter 10 would normally be used to step-up a voltage received at one level, the converter 10 could be used in other applications as well. For example, the converter 10 would also have application in battery powered devices where a relatively constant voltage must be provided for circuit operation in spite of a declining battery voltage as the battery approaches exhaustion. Such a device would be expected to remain in a quiescent (sleep) mode while the battery was fully charged. As the battery voltage falls, the device 10 would sense the declining voltage and step the voltage up as needed.

With regard to the actual voltage produced, an expression for the output voltage $V_{OUT}$ in terms of a supply voltage $V_{INPUT}$ can be written as follows:

$$V_{OUT} = \frac{D(V_{INPUT} - V_S) + (1 - D)(V_{INPUT} - V_D)}{1 - D}$$

where $D = t_{ON}/T$, $V_D$ is diode voltage, and $V_S$ is switch voltage.

Where an acceptable level of output voltage ripple $\Delta V_{OUT}$ is specified by the circuit application, a value of C can be determined from the expression:

$$C = \frac{D}{(R \Delta V_{OUT} f_s)}$$

where $f_s$ is the switching frequency (e.g., 300 MHz). Similarly, a value for the inductance L may be determined from the expression:

$$L = \frac{V_{OUT} D (1 - D)^2}{2 I_{OUT} f_s}$$

where $I_{OUT}$ is the output current of the converter 10.

Table I shows a list of values for a set of three different converters 10 under different embodiments of the invention. The first row shows a voltage and current provided by the converter 10. The value $W_{GATE}$ is a junction thickness of the switch S. The value $C_{GATE}$ is a calculated capacitance value of the switch S.

TABLE I

| | | | |
|---|---|---|---|
| $V_{OUT}/I_{OUT}$ | 5 V/35 mA | 5 V/200 mA | 10 V/200 mA |
| $\Delta V_{OUT}$ | 0.25 V | 0.5 V | 1.0 V |
| $R_L$ | 150Ω | 25Ω | 50Ω |
| D | 0.2 | 0.2 | 0.2 |
| $f_s$ | 300 MHz | 300 MHz | 300 MHz |
| L | 32 nH | 6.4 nH | 9.6 nH |
| C | 11 pF | 64 pF | 48 pF |
| $W_{GATE}$ | 205 µm | 1025 µm | 1025 µm |
| $C_{GATE}$ | 3.8 pF | 1.9 pF | 1.9 pF |

Figure 4:
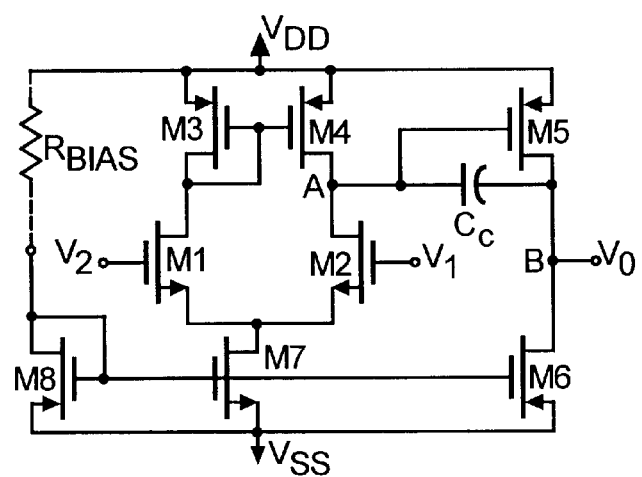
FIG. 4 is a schematic view of the amplifier of FIG. 1.

FIG. 4 shows a CMOS amplifier 18 that may be fabricated as part of the converter 10. The amplifier 18 of FIG. 4 may be fabricated using the device parameters as shown in TABLE II.

TABLE II

| | M1 | M2 | M3 | M4 | M5 | M6 | M7 | M8 |
|---|---|---|---|---|---|---|---|---|
| W µm | 60 | 60 | 30 | 30 | 60 | 10 | 10 | 10 |
| L µm | 1.2 | 1.2 | 1.2 | 1.2 | 1.2 | 1.2 | 1.2 | 1.2 |

Figure 5:
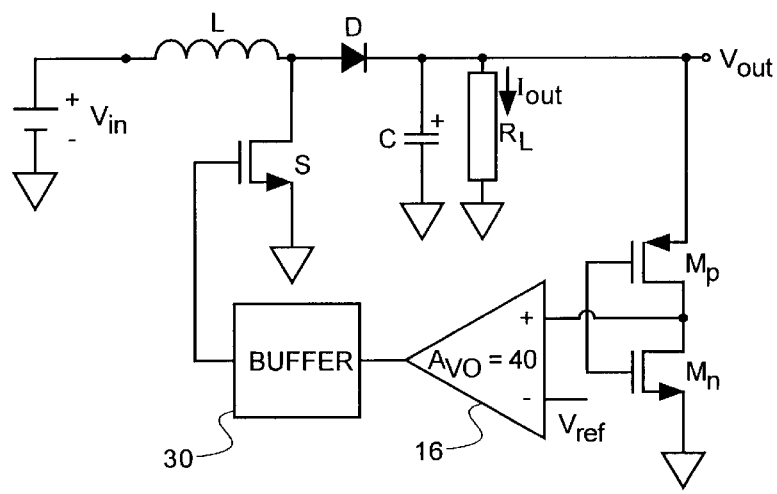
FIG. 5 is a schematic view of the DC to DC regulator of FIG. 1 under an alternate embodiment.

Using the parameters of TABLE II, an amplifier 18 may be fabricated having a gain $A_{VO}$ of 18,786 and a gain bandwidth GB of $6.4 \times 10^{11}$ Hz. The amplifier 18 may also have a SR value of 300 V/ns, a 3 db frequency of 48.15 MHZ and an $A_v$ of 700 at 900 MHZ.

Where the amplifier 18 is found to have insufficient gain to drive the switch S, a buffer 30 may be interposed between the amplifier 18 and switch S as shown in FIG. 5. Provisions may also be made within the buffer 30 for starting the converter 10 for those converter designs which are not self-starting.

Figure 6:
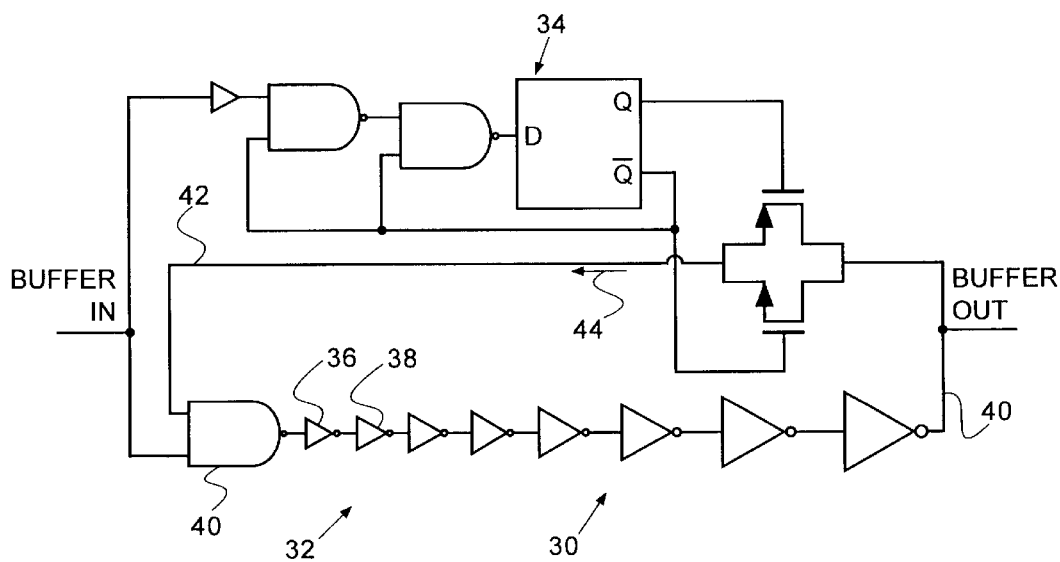
FIG. 6 is a schematic view of the buffer of FIG. 5.

FIG. 6 shows an example of an amplifier 32 that may be used in series with the amplifier 18 to increase the drive capabilities of the amplifier 18. This may be done by using a number of cascaded buffer stages, as in FIG. 6. The amplifier 18 feeds a minimum sized CMOS inverter 36 which, in turn, feeds the largest size inverter 38 that it can feed while still staying within the permissible rise/fall times of the specification. For 300 MHZ operation, a rise/fall time of 0.2 ns would be acceptable. The inverter size is increased in each successive stage until the final stage is finally capable of driving the nMOS switch S, which may have an input capacitance of up to 6.3 pF for the example considered.

Where the converter 10 is not self starting, the cascaded buffer stages may be connected as a ring oscillator, as shown in FIG. 6. As shown, an additional NAND gate 40 is used to produce an odd number of stages in the oscillator ring 32 to ensure oscillation. The NAND gate 40 also amplifies and transmits the switching signal from the amplifier 18 of the Schmidt trigger 16 once steady state operation is achieved. Further, once steady state conditions are achieved, a latch 34 is set, disabling the feedback path 44 of the ring oscillator 32.

Figure 2:
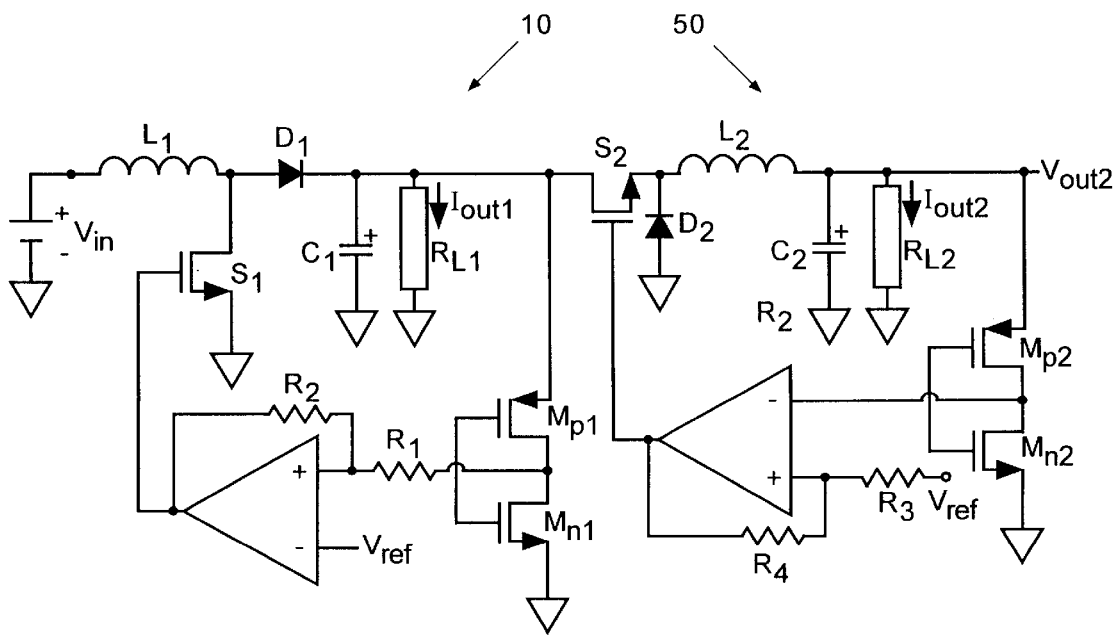
FIG. 2 is a schematic view of the DC to DC converter of FIG. 1 coupled to a voltage regulator.
Figure 3:
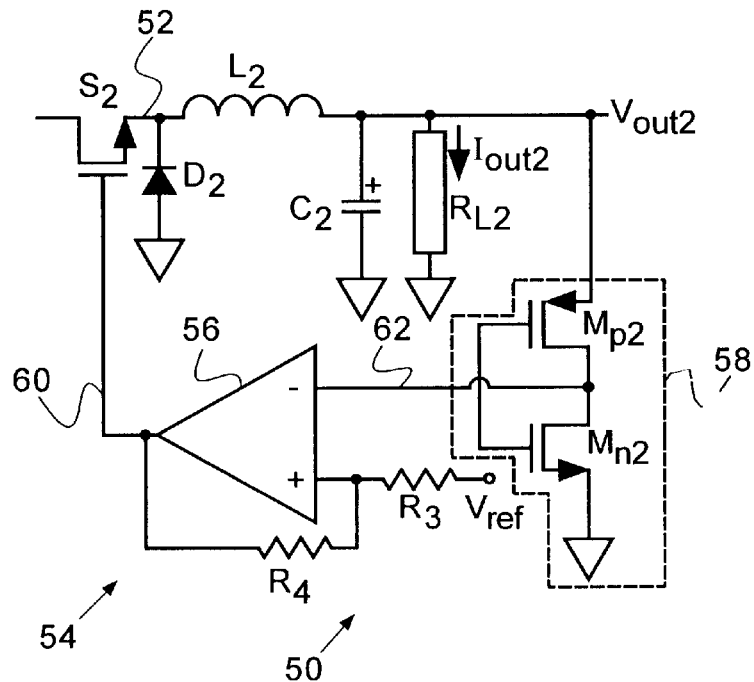
FIG. 3 is a schematic view of the voltage regulator of FIG. 2.

FIG. 3 is a voltage regulator 50 that may be used, either alone, or with the step-up converter 10 of FIG. 1. The regulator 50 may be used alone in those cases where a voltage required is less than a DC line voltage or with the step-up converter 10 as shown in FIG. 2 in those cases where the ripple from the step-up converter 10 is objectionable.

The voltage regulator 50 of FIG. 3 is similar to the step-up converter 10 in some regards and different in other regards. For example, the regulator 50 would also be fabricated as an integral part of the multifunction chip upon which it would be used. The regulator 50 would also, in most cases, assume the same current capabilities as the step-up converter 10.

One difference with the regulator 50, however, is that the controlling switch $S_2$ is in series with the inductor $L_2$. Further, the diode $D_2$ serves to limit any transients associated with any switching operation by forming a ground loop around the inductor $L_2$ through the capacitor $C_2$. The Schmidt trigger 54 also uses an inverting amplifier 56, as opposed to the non-inverting amplifier 18 used in the step-up converter 10.

The regulator 50 of FIG. 3 functions by comparing a divided portion of an output voltage $V_{OUT2}$ with a reference value $V_{ref}$ and using the results of such comparison as a means of controlling a input switch $S_2$. An inductor $L_2$ and capacitor $C_2$ serve to filter an output of the switch $S_2$.

A voltage divider 58 is used for dividing the output voltage $V_{OUT2}$. A series connected set of CMOS transistors $M_{p2}$ and $M_{n2}$ provide a convenient means of dividing the output voltage $V_{OUT2}$ while minimizing power loss within the regulator 50.

An amplifier 56 functioning as a Schmidt trigger 54 receives the divided voltage from the divider 58 and compares the divided voltage 62 with a reference voltage $V_{ref}$. Where the divided voltage falls below the reference voltage $V_{ref}$, the amplifier 56 activates the switch $S_2$.

As the switch turns on, current begins flowing through inductor and the capacitor begins charging. As the capacitor begins charging, the output voltage (and divided output voltage 62) begins rising. When the divided output voltage 62 rises above a hysteresis voltage determined by $R_3$ and $R_4$, the amplifier 56 turns off. As the output voltage falls, the process repeats. Control of ripple in the output voltage of better than 1% may be provided with the appropriate selection of resistor values $R_3$ and $R_4$.

A specific embodiment of a method and apparatus of DC voltage conversion according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

We claim:

1. A DC to DC voltage converter comprising:
   a voltage step-up device;
   a rectifier connected to an output of the voltage step-up device which provides an output of the DC to DC voltage converter; and
   a switch operating at a load-dependent switching frequency and triggering the voltage step-up device each time the output of the DC to DC converter falls below a threshold voltage, the voltage step-up device, rectifier and switch all being fabricated within a substrate of a single integrated circuit.

2. The DC to DC converter as in claim 1 further wherein the voltage step-up device further comprises a power supply connected in series with an inductor.

3. The DC to DC converter as in claim 1 further comprising a capacitor coupled across an output of the DC to DC step-up converter.

4. The DC to DC converter as in claim 1 wherein the switch further comprising a MOSFET device.

5. The DC to DC converter as in claim 1 further comprising a voltage divider coupled across the output of the DC to DC converter.

6. The DC to DC converter as in claim 1 further comprising an operational amplifier with an output of an operational amplifier driving the switch, and a first input of an operational amplifier coupled to a divided voltage output of the voltage divider.

7. The DC to DC converter as in claim 6 further comprising a reference voltage coupled to a second input of the operational amplifier.

8. The DC to DC converter as in claim 7 wherein the operational amplifier further comprises a Schmidt trigger.

9. The DC to DC converter as in claim 5 wherein the voltage divider further comprising a p-channel and an n-channel MOSFET switch connected in series and a voltage divider output obtained from a common connection between a gate of each MOSFET and a midpoint in the series connection.

10. The DC to DC converter as in claim 1 further comprising a voltage regulator coupled to the output of the DC to DC voltage step-up converter and providing a regulated voltage at an output from the voltage regulator.

11. The DC to DC converter as in claim 10 wherein the voltage regulator further comprises an LC filter providing the regulated output voltage at the output of the LC filter.

12. The DC to DC converter as in claim 11 wherein the voltage regulator further comprises a regulating switch connecting an output of the DC to DC voltage step-up converter to an input of the voltage regulator.

13. The DC to DC converter as in claim 12 wherein the voltage regulator further comprises a regulating voltage divider connected to the output of voltage regulator and coupling a control voltage back to the regulator switch.

14. The DC to DC converter as in claim 13 wherein the voltage regulator further comprises a Schmidt trigger receiving as a first input a divided voltage from the regulating voltage divider and providing an output to the regulating switch.

15. The DC to DC converter as in claim 14 wherein the voltage regulator further comprises a diode connected across the input to the LC filter.

16. The DC to DC converter as in claim 7 further comprising a buffer disposed between the operational amplifier and the switch.

17. The DC to DC converter as in claim 16 wherein the buffer further comprises a ring oscillator.

18. A monolithic DC to DC voltage step-up converter comprising:

an inductor, with a first end of the inductor connected in series with a positive side of a power supply, the power supply also having a negative side;

a diode, with a first end of the diode connected in series with a second end of the inductor;

a capacitor, with a first end of the capacitor connected between a second end of the diode and the negative side of the power supply and the voltage across the capacitor defining an output of the monolithic DC to DC voltage step-up converter;

a voltage divider connected in parallel with the capacitor;

an operational amplifier receiving a divided voltage output from the voltage divider as a positive input and a reference voltage as a negative input; and a switch receiving an output of the operational amplifier as a controlling input and switching the second side of the inductor between a potential substantially equal to the positive side of the power supply and the negative side of the power supply, with the inductor, diode, capacitor, voltage divider, operational amplifier and switch all being fabricated within a substrate of an integrated circuit forming the monolithic DC to DC voltage step-up converter.

* * * * *